Nov. 14, 1944.   J. CLARK   2,362,467
EXCITATION OF VIBRATION IN STRUCTURAL MEMBERS
Filed Nov. 18, 1941   4 Sheets-Sheet 1

INVENTOR
JAMES CLARK
BY
ATTORNEYS

Nov. 14, 1944.   J. CLARK   2,362,467
EXCITATION OF VIBRATION IN STRUCTURAL MEMBERS
Filed Nov. 18, 1941   4 Sheets-Sheet 2
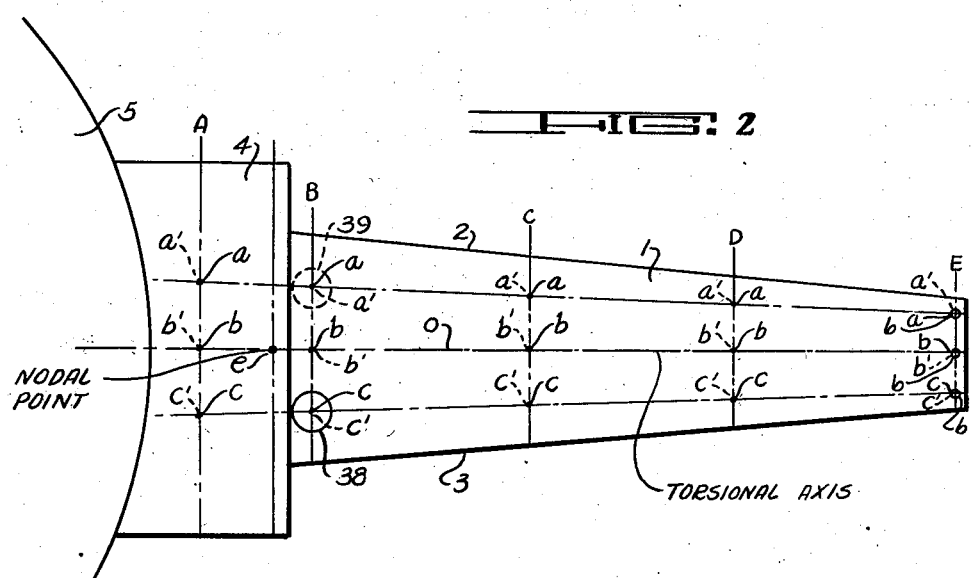
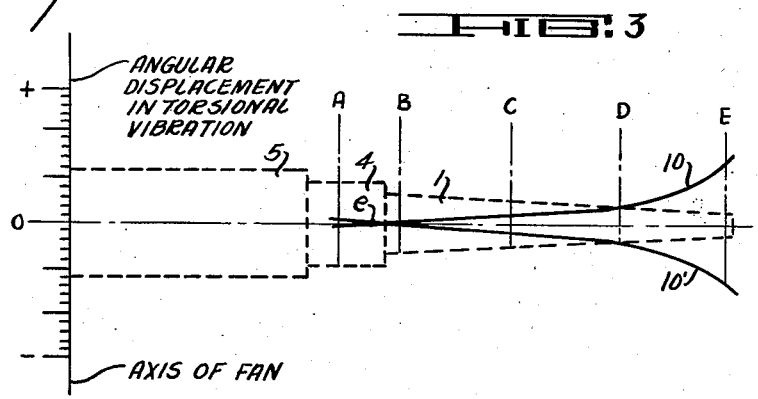
INVENTOR
JAMES CLARK

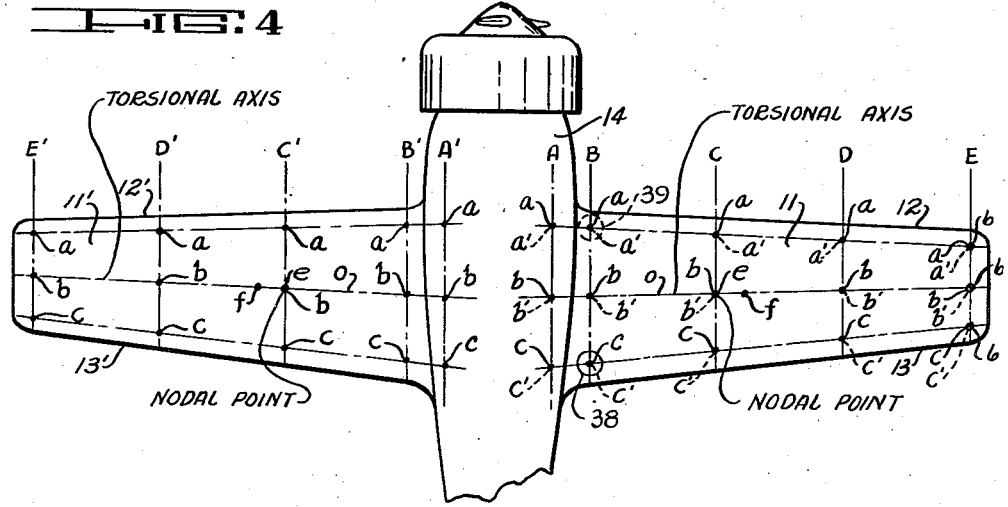
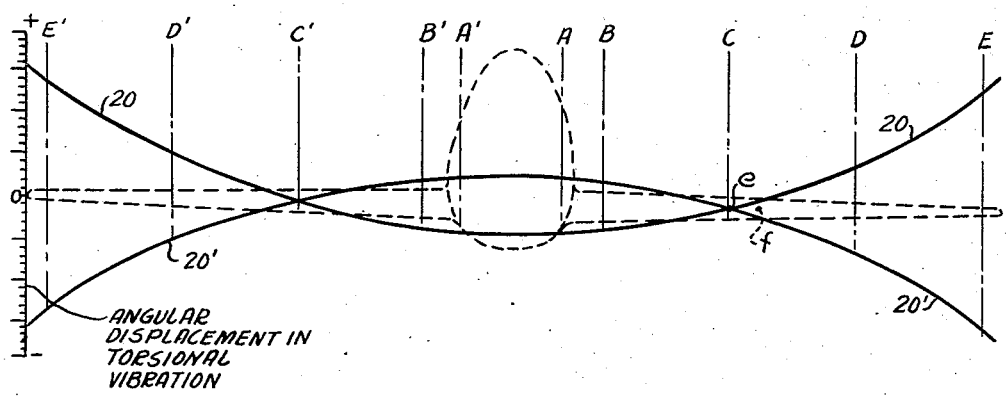

Nov. 14, 1944. J. CLARK 2,362,467
EXCITATION OF VIBRATION IN STRUCTURAL MEMBERS
Filed Nov. 18, 1941 4 Sheets-Sheet 4
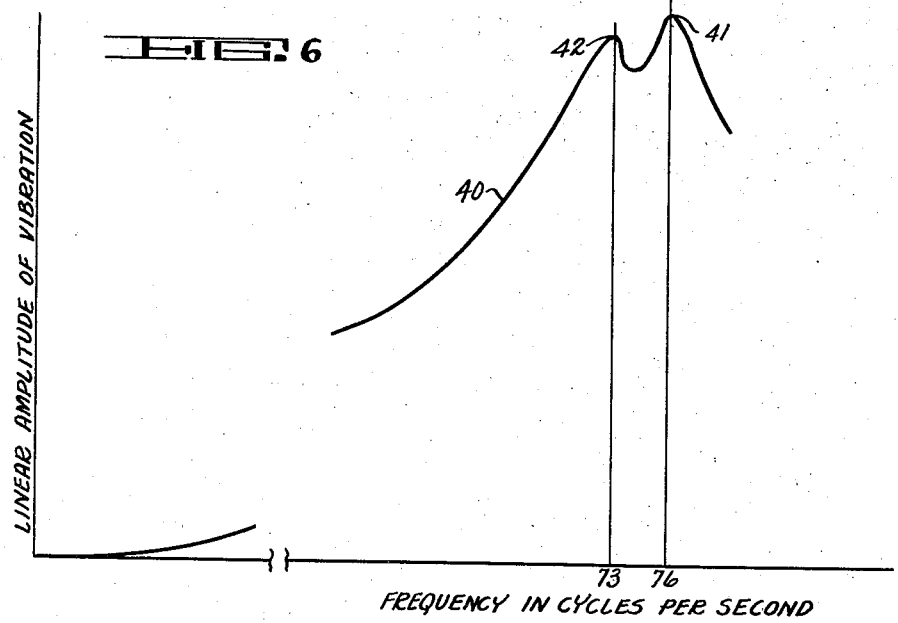
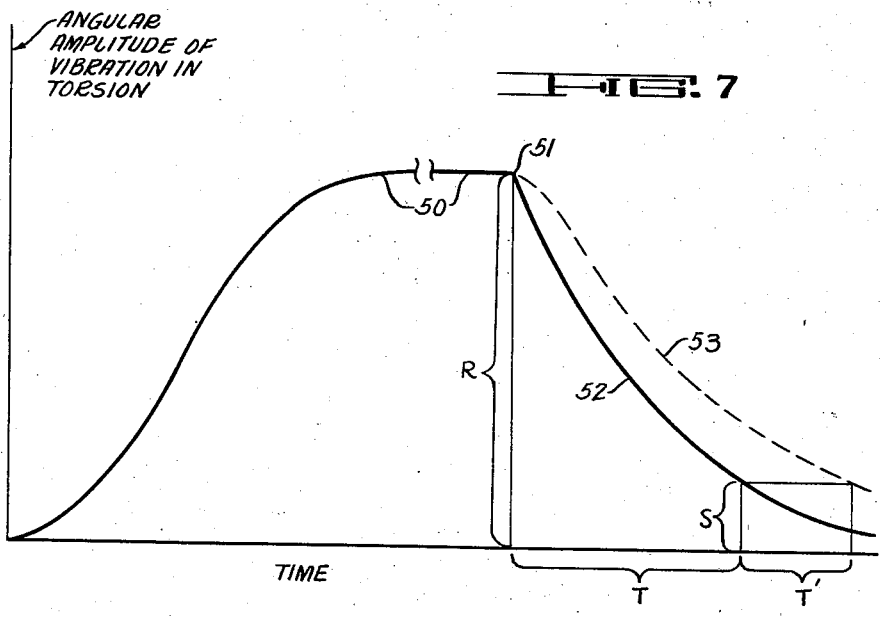
INVENTOR
JAMES CLARK
BY
ATTORNEYS Patented Nov. 14, 1944

2,362,467

UNITED STATES PATENT OFFICE 2,362,467

EXCITATION OF VIBRATION IN STRUCTURAL MEMBERS

James Clark, Dayton, Ohio

Application November 18, 1941, Serial No. 419,623

16 Claims. (Cl. 73—67)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a method for exciting vibration in structural members.

The general object of the invention is to provide an improved method for exciting specific types of vibration in structural members.

A particular object is to provide a method for exciting pure torsional vibration, free of bending components.

A further object is to provide a method for producing various modes of pure torsional vibration in a structural member without altering the natural resonant frequencies of the member.

A further object is to provide a method for producing various modes of vibration in bending, free of torsional components.

A further object is to provide a method for simultaneously producing a combination of desired modes of vibration in torsion and bending.

A further object is to provide an improved method of investigating the vibration characteristics of a structural member.

A further object is to provide an improved method of locating the torsional axis of a structural member.

In accomplishing the above objects the present invention overcomes a number of difficulties heretofore experienced in the investigation of vibration characteristics of structural members. Chief among these difficulties, in the methods commonly employed, has been an inability to excite vibrations in pure torsion, free of bending, and vibration in pure bending, free of torsion; and an inability to conveniently and accurately determine the amplitudes and phase relations of various parts of a vibrating structure. Further difficulties have arisen through inherent limitations in the physical apparatus employed, and through the manner of using such apparatus. For instance, mechanical vibrators of the reciprocating or revolving eccentric weight types, heretofore extensively used to excite vibration in structural members, cannot be conveniently and accurately adjusted as to both output and frequency while in operation. Motor-driven vibrators are also inherently poor in frequency stability, since there exists a coupling effect involving a feed-back of energy from the vibrating member, which tends to cause the vibrator to drift into a resonant frequency of the member as the vibrator approaches such a frequency. It thus becomes impossible to obtain the true shape of the resonance curve of the member under investigation.

Also, mechanical vibrators having rotating parts are unsatisfactory in damping investigations involving the convenient logarithmic decrement method. The inertia of the revolving parts, together with the coupling effects above mentioned, causes the mechanism to continue to operate after the power supply has been interrupted. Thus the output force of the vibrator cannot be terminated instantaneously to allow the vibration of the structure to diminish naturally. Further, as the vibrator slows down, the frequency is continuously changing.

The present invention provides an improved manner of exciting the desired vibrations, and also provides an improved method of investigating and measuring the vibration amplitudes produced in various parts of the vibrating structure. In the past, strain gauges have been employed in an attempt to evaluate vibration characteristics, but strain values alone have not proved adequate. It is difficult to convert values of strain into amplitude, which is essential to obtain a complete understanding of the behavior of the member under vibration.

Although the methods of excitation of the present invention might be accomplished manually at low frequencies, or by various types of apparatus in different frequency ranges, a preferred embodiment of apparatus will presently be described for carrying out certain steps of the various method claims; but it is to be understood that this specific system and apparatus are described for purposes of illustration only, and that there is no intention of limiting the invention thereto. The invention is to be limited only by the scope of the appended claims.

The attached drawings are illustrative of the manner of carrying out the method steps of the present invention, and include apparatus which may be used according to the specification to accomplish the objects and purposes set out.

In the drawings:

Fig. 2 is an elevation view of an airfoil comprising a wind tunnel fan blade and illustrating the method of the present invention.

Fig. 3 illustrates characteristic amplitude curves for the fan blade shown in Fig. 2, when the latter is excited in a particular mode of torsional vibration.

Fig. 4 is a plan view of the wing surfaces of an airplane showing the application of the present invention thereto.

Fig. 5 illustrates characteristic amplitude curves for the airplane wings shown in Fig. 4 when excited in a particular mode of torsional vibration.

Fig. 6 is a curve of vibration amplitude plotted against frequency for a particular structural member, showing how a particular mode of torsional vibration may produce a resonant frequency very close to the resonant frequency from a particular mode of vibration in bending.

Fig. 7 illustrates characteristic damping curves of a structural member excited in torsional vibration.

Figure 1:
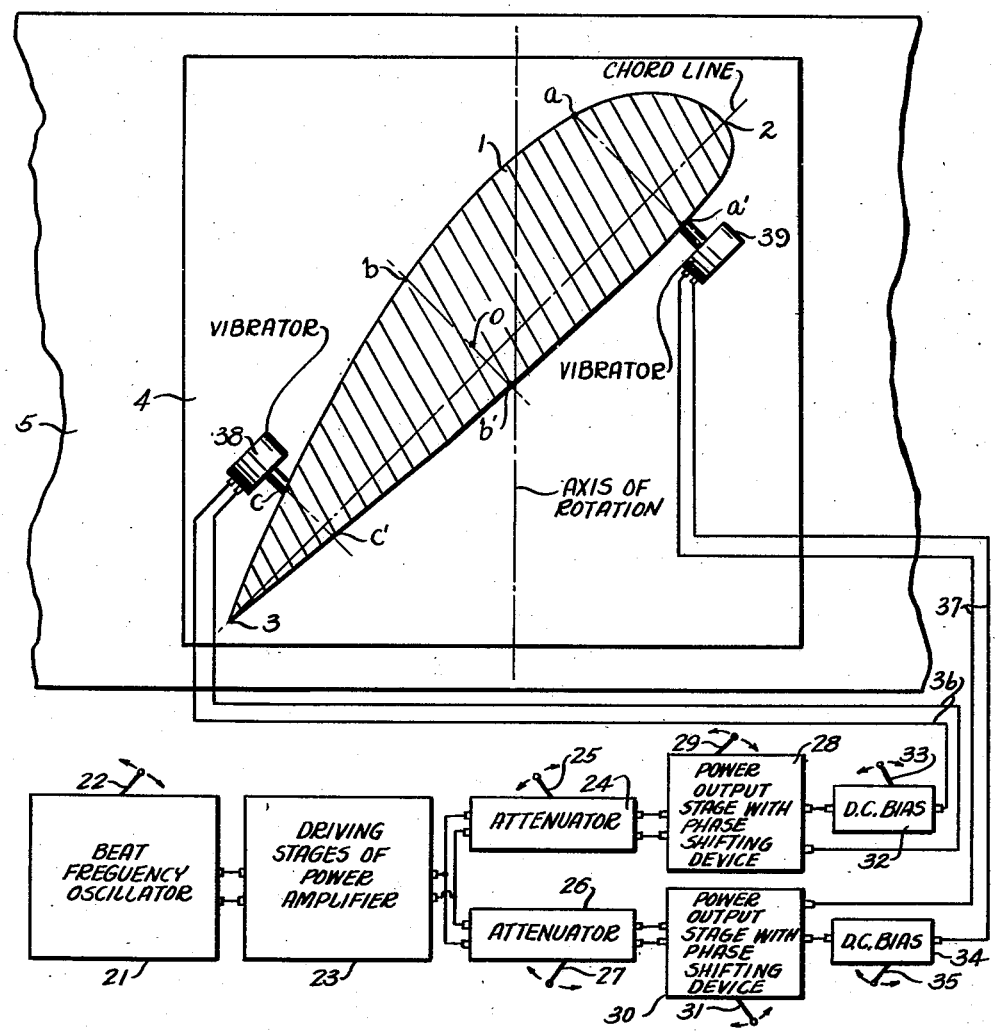
Fig. 1 illustrates certain principles of the invention, and includes a schematic diagrammatical showing of an application of a preferred system and apparatus to an airfoil or the like, for carrying out the method, the sectional view of the airfoil being taken through section B in Fig. 2.

The method of obtaining pure torsional vibration in accordance with the principles of the present invention will first be described. In the wind tunnel fan blade illustrated in Figs. 1 and 2, the fan blade 1, having a leading edge 2 and a trailing edge 3, is secured to a fan blade base 4 mounted on a hub 5, the blade 1 being one of many mounted around the hub. The practice of this phase of the invention involves the application of a pair of equal vibrating mechanical forces to the member to be vibrated in the relation of a mechanical couple so that there are no unbalanced forces tending to produce bending.

To apply the vibrating forces to the best advantage, it is desirable to first locate the torsional axis of the member. With a little experience, the location of the torsional axis may be estimated rather closely, or it may be calculated mathematically in the case of simple structures, or it may be obtained experimentally. A convenient experimental method of locating the torsional axis of the present fan blade 1 is to vibrate the blade in torsion and obtain readings from vibration pickups 6 located at various stations on a surface of the blade, such as the illustrated stations $a$, $b$, $c$, on the cambered face, or $a'$, $b'$, $c'$ on the flat face, shown at each of the sections A, B, C, D, E. For example, considering for the present the section B, vibration pickups may be located near the leading and trailing edges as at stations $a$ and $c$, or $a'$ and $c'$, respectively. The output from each of these vibration pickups may be connected to a recording oscillograph, where the amplitude of each of these pickups and their relative phasing may be observed and recorded, in a known manner. The blade is then excited at a slowly increasing frequency until maximum amplitudes of the two vibration pickups are obtained, having a 180-degree relative phase difference. The condition of maximum amplitude indicates a resonant vibration, and the 180-degree phase difference between the leading and trailing edges indicates that the vibration is in torsion and not in bending.

Then, either the leading or the trailing edge pickup is detached and moved slightly chordwise along the fan blade. A certain point will be found at which the amplitude of this pickup is very low. On one side of this point the phasing of the movable pickup relative to the stationary pickup will be 180 degrees, and on the other side of this point the outputs from the two pickups will be in phase. This point, then, lies in the projection of the torsional axis of vibration on the surface of the fan blade. On the cambered surface in Fig. 1 this point is designated as $b$, and on the flat surface as $b'$. It is, of course, desirable to conduct this investigation on the surface closer to the torsional axis, which is the chord or flat surface containing the point $b'$. The torsional axis $o$ lies on a line connecting the points $b$ and $b'$ in Fig. 1, but for purposes of the present method it is necessary to locate only the point $b'$. To locate the position of the torsional axis, or rather its projection, along the flat surface of the blade, this procedure may be repeated at the other sections A, C, D, and E. The showing of the torsional axis in Fig. 4 is diagrammatic only, as it is not ordinarily a straight line in this type of structure.

A vibration pickup may then be attached at each of the stations $a'$, $b'$, $c'$ on the various sections. The occurrence of pure torsional vibration, free of bending, and at the resonant frequency of the blade for a particular mode of vibration, may then be determined with certainty by observing the relative outputs and phasing of the pickups at the various stations.

If, for instance, it is desired to excite the fan blade 1 in vibration in the first mode torsion, phased vibrating forces may be applied in the relation of a mechanical couple about the torsional axis $o$ to determine the location of the nodal point $e$. The section containing the nodal point is characterized by the exceedingly small vibration amplitudes of all points in the section. The vibrating forces should then be moved to a section some distance from the section containing the nodal point. If the two vibrating forces are equal, are properly phased, and are applied, for instance, in the plane of section B at equal distances from the point $b'$, such as for instance at stations $a'$ and $c$, a vibrating couple will result which will excite the blade 1 in pure torsional vibration. Since the forces of this couple are balanced, in that the summation of forces in any direction at any instant is equal to zero, there will be no excitation of the blade in bending. While as a general proposition it is theoretically not necessary to apply a mechanical couple symmetrically about the torsional center or torsional axis of a body, it is found that better results in the present case are obtained by doing so, since the symmetrical arrangement of forces tends to eliminate the possibility of forced vibration of parts or the whole of the structure.

Assuming now that the vibrating couple is applied at the stations $a'$ and $c$ on section B in the manner described, and that vibration pickups are located at the stations $a$, $b$, $c$ on the cambered surface of the fan or, preferably, $a'$, $b'$, $c'$ on the flat surface of the fan blade, the excitation of pure torsional vibration free of bending may be ascertained by the following behavior of the various vibration pickups. The vibration pickups at station $b'$ on each section will register a very small amplitude, due to the proximity of the torsional axis; the vibration pickups at each station $a'$ will exhibit relatively large amplitudes of different values; and the vibration pickups at the stations $c'$ will likewise indicate relatively large amplitudes of different values, 180 degrees out of phase with the amplitudes of station $a'$. Assuming that the mode of vibration under consideration produces a single nodal point located at $e$, the amplitude at section E will be the greatest, as recorded by the vibration pickups 6 at stations $a'$ and $c'$. The amplitudes at the stations $a'$ and $c'$ on the sections D, C, and B will be found to decrease progressively as the nodal point is approached, according to the curves 10 and 10' in Fig. 3. Section B, being relatively close to the nodal point e, will register small amplitudes even at stations a' and c', but nevertheless the station a' on this section will be in phase with the stations a' on sections C, D, and E; and station c' in this section will be in phase with the station c' on sections C, D, and E.

The amplitudes at stations a' and c' on section A through the fan blade base, for this particular mode of torsional vibration, may be exceedingly small, because of the rigidity of the base and because this section is also close to the nodal point e; and it will be found that the amplitude at station a' in this section is 180 degrees out of phase with the amplitudes of stations a' in the other sections. Likewise, the amplitude of station c' in section A will be 180 degrees out of phase with the amplitudes of stations c' in the other sections, or in other words the amplitude of stations c' in section A will be in phase with the amplitudes of stations a' in sections B, C, D, and E. The absence of bending may be confirmed by the small vibration amplitude of each station b' adjacent the torsional axis. Thus the curves 10 and 10' in Fig. 3 may be said to represent the maximum angular excursions of the various parts of the blade in both directions from the static position in first mode torsional vibration.

The same mode of torsional vibration may be excited by applying the vibrating couple at any other section along the blade, such as, for instance, the illustrated sections C, D, or E, or at a section through the base, such as section A, so long as the couple is not applied at the section through the nodal point e. Higher modes of torsional vibration may be excited by suitably adjusting the frequency, and selecting the points of application of the vibrating couple so as to avoid nodal sections.

The general procedure above described could obviously be applied to any structural member capable of vibrating in torsion, and as a further example of the application of this procedure to airfoils, reference is made to Fig. 4 involving the wings of an airplane. In Fig. 4 there are illustrated a pair of airfoils comprising wings 11 and 11' having leading edges 12 and 12' and trailing edges 13 and 13'. The wings are considered to be rigidly attached to a fuselage 14 in any conventional manner. Thus, when viewed from the right, any section of wing 11, such as section B or section C, will appear somewhat similar to the fan blade section in Fig. 1 except for differences in the proportions of the airfoil, its angle of attack, and supporting structure. The torsional axis o may be located experimentally as in the fan blade, and the vibrating couple applied at the stations a' and c in section B. The nodal point in the wing 11 for first mode torsional vibration will be found to fall at some point e along the torsional axis, which point in the present instance is represented as lying in the section C. Then, since the vibration is in pure torsion, the various stations b and b' near the torsional axis throughout the length of the wing will experience relatively small amplitudes, and all the stations in section C passing through the nodal point will theoretically experience a zero amplitude.

The angular amplitudes of the various parts of the structure in first mode torsional vibration may then be illustrated by the curves 20 and 20' in Fig. 5, representing the maximum angular excursions of the structure throughout its length. Thus it is seen that stations a in sections D and E are in phase and that the amplitudes increase in both directions from the nodal point e. It is seen that the phase changes at the nodal point e so that stations a in sections A and B are in phase with stations c in sections D and E. Stations c in sections A and B are similarly in phase with the stations a in sections D and E.

In the case illustrated, displacements are symmetrical in both wings as illustrated in Fig. 5, with regions of maximum amplitude occurring at the wing tips and in the center of the fuselage. It is, of course, understood that Fig. 5 is merely illustrative of first mode torsional vibration for a particular structure, and that additional modes of torsional vibration may be excited. To excite torsional vibration in a particular mode, the vibrating forces may be applied to the wings or fuselage at various points, with the exception of the nodal sections. Thus, instead of applying the vibrating forces in the section B, they may be applied near the wing tip, as for instance at section E, or at section D, or even at section A in the fuselage itself. If the vibration pickups at the several stations b or b' all indicate small amplitudes, it is thereby ascertained that the vibration is one of pure torsion, whereas if certain of the stations b or b' experience large amplitudes of vibration, bending is obviously taking place. The projection of the torsional axis is a line through the points b on one wing surface, and a line through the points b' on the other wing surface, and the torsional axis, as well as its projections on the wing surfaces, are not ordinarily straight lines, the present showings being diagrammatic only.

As a corollary to the above-described method of producing pure torsional vibration, free of bending, it will be appreciated that the fundamental principles of the present inventive teaching may be applied in a different manner to produce pure bending, free of torsion. This is done by locating the torsional axis, and then applying a vibrating force normal to said axis so that no torsional moments are produced. The nodal point, or section, is located, and the vibrating force is moved along the torsional axis to a point spaced an optimum distance from the nodal point.

In Fig. 4, for example, let f represent the nodal point, or location of the nodal section, for vibration in first mode bending. A vibration pickup anywhere on this section would theoretically indicate zero amplitude, and so the vibrating force should be applied at some distance from point f, somewhere on the line joining points b, or on the line joining points b', as for instance at station b' on section C, or station b' on section D. Vibration pickups at all the indicated stations along the wings would register linear amplitudes corresponding in a general way with the angular displacement curves 20 and 20', except that the nodal point would be at f instead of e. If no torsion is present, all the stations in each section will register identical amplitudes. If there is torsion present, the stations b and b' will be found to experience smaller amplitudes than the stations a, a', c, and c' in the same sections.

To excite vibration in pure bending it is not absolutely necessary, however, to confine the application of the vibrating forces to the torsional axis itself, provided that they are arranged so as to produce a zero moment about the torsional axis.

For instance, vibrating forces in phase may be applied at section D, being spaced on opposite sides of the station b' and in the regions of stations a' and c', so that their moments about the torsional axis are equal and opposite. There being no torsional excitation, vibration in pure bending will result.

To facilitate higher orders of vibration in either torsion or bending, vibrating forces may be applied at a plurality of sections along the structural member, between nodes for the particular mode of vibration desired. If vibration in second or third mode torsion is desired, vibrating couples may be applied at two or more different sections, between nodes, and the phasing appropriately adjusted to allow for the 180° phase shift on opposite sides of each nodal section. Likewise, if vibration in second or third mode bending is desired, vibrating forces may be applied normal to the torsional axis at points between nodes; or, alternatively, pairs of vibrating forces having zero torsional moments as described above may be applied at a plurality of sections spaced between nodes, the phasing and frequency being adjusted in either case in accordance with the deformation pattern for the particular mode of vibration desired.

By correlating the strength, frequency, and phasing of the vibrating forces, and the locations of the points of application of these forces, the fan blade, airplane wing, or other structural member may be vibrated in a combination of bending and torsion. Experimentation on any particular member will reveal the force values and points of application thereof to excite the particular modes of torsional and bending vibration desired, so that flight conditions may be accurately simulated. The particular modes of vibration which can be excited, and the resonant frequencies thereof, will of course be determined by a number of factors such as the proportions, mass, stiffness, damping, etc., of the various components.

For producing modes of vibration at relatively low frequencies, the vibrating forces might conceivably be produced manually. Also, various types of apparatus may be devised to furnish satisfactory vibratory forces. There is illustrated in Fig. 1, however, vibration apparatus which is at present preferred in the carrying out of the described method of the invention. Inasmuch as it is desirable to have vibrators applicable to a wide variety of structural elements, and through a great range of frequencies, the source of energy comprises a beat frequency oscillator 21 giving a sinusoidal voltage output over a frequency range of 0-24,000 cycles per second, obtainable in substantially stepless increments by means of the variable control 22. Any other alternating current source having such characteristics may be employed. The output of the oscillator 21 is connected to the input of the driving stages 23 of the power amplifier, which consists of a single set of driving stages supplying two power output stages 28 and 30 through suitable attenuators 24 and 26. The outputs of the individual channels may be controlled by the variable means 25 and 27 associated with the attenuators, and the phase relation of the channels may be adjusted by means of phase-shifting devices 29 and 31. The attenuators 24 and 26 may, however, precede, or be included in, the driving stages 23. If necessary, a D. C. bias may be added at 32 and 34, the values being variable under the control of means 33 and 35. Thus the two output channels 36 and 37 may constitute the source of supply for the vibrators 38 and 39, the power and phase relation of each being independently adjusted.

If desired, the power output controllers 25 and 27 may be operated in such a manner that the power in one channel is increased as the power in the other channel is simultaneously decreased, or for other purposes the means 25 and 27 may be operated to simultaneously increase or decrease both power outputs in the same ratio, or in any desirable ratios. The D. C. bias stages at 32 and 34 are desirable under certain conditions when magnetostrictive types of vibrators are used, the D. C. bias being capable of a combined function of rectifying the output and also controlling the power. It is found that the power output of a magnetostrictive vibrator may be smoothly controlled throughout a wide range through the simple expedient of varying the D. C. bias, and in the operation of the present system it is intended that the power output be controlled by controlling the output of source 21, by means of the attenuators 24 and 26, or by means of the D. C. bias components 32 and 34, or by a combination of these means.

The vibrators 38 and 39 may be either magnetostrictive, magnetic, or any other type which converts a pulsating electromotive force into a pulsating mechanical force at the desired frequency.

When a conventional magnetic type vibrator is used, the D. C. bias represented by components 32 and 34 is removed from the output circuits of the two power output stages.

The vibration pickups herein referred to are capable of producing responses convertible into terms of displacement. There are three known types, each having its particular field of application and range of usefulness, these three types being responsive, respectively, to displacement, velocity, and acceleration. In the use of displacement pickups, the resulting variations in impedance in the electrical circuit produce displacement indications without subsequent integration.

Velocity pickups are best suited for relatively high frequencies, since the voltage generated decreases as the velocity decreases. The output of this pickup must be integrated electrically or otherwise to give values in terms of displacement.

Acceleration pickups may utilize the magnetostrictive properties of certain materials to produce variations in an electrical circuit responsive to the accelerations of a vibrating body. The output may be converted into terms of displacement by any known device, such as for instance conventional double integrating circuits.

It is thus seen that each vibration pickup 6, regardless of the type employed, is capable of producing indications of the behavior of a particular point, or station, on the vibrating structure under study. Through the use of an oscillograph in a manner well understood in the art the outputs of a number of vibration pickups, in terms of displacement, may be simultaneously recorded, together with a timing wave, whereby the frequency and phase relations, and values of amplitude, may be measured and compared. These displacement, or amplitude, records, when compared and analyzed according to the teachings of the present invention, tell whether the vibration is in bending or torsion, or a combination of both; they give the frequency or frequencies; and they reveal the locations of nodes, and the values of amplitudes in various parts of the vibrating structure. Such records may be obtained when the structure is functioning in its normal and intended use as well as when the vibrations are being excited artificially by vibration excitation systems.

In choosing the most suitable type of vibration pickup, consideration must be given to the relative masses of the pickup and the part of the structure to which it is to be attached, and to the ranges of frequencies and amplitudes to be encountered, so as to avoid altering the vibration characteristics of the structure, and to avoid transcending the operating range of the pickups.

To produce pure torsional excitation in a structural member, it is found to be necessary to exert vibratory forces about the torsional axis in the form of a vibratory couple wherein the forces are equal and opposite and perfectly synchronized in time. This requires a very accurate phasing between the force impulses, which cannot be obtained with the conventional type of motor-driven vibrators. In the present electronic vibrator the vibrator units are driven by a sinusoidal pulsating electromotive force whereby the frequency and phase relation are under accurate control at all times and cannot vary in the course of operation, due to outside factors.

The matter of frequency stability is a critical requirement, and is one wherein the present electronic system is vastly superior to motor-driven vibrators. This superiority arises from the fact that it is impossible for any energy from the member being vibrated to feed back to the beat frequency oscillator and thus change the frequency at which it is oscillating. This is an especially important feature when it is necessary to separate two or more resonance frequencies which are very close together. In Fig. 6, for instance, 40 represents the resonance curve of a particular structure having a frequency of resonance in first mode torsional vibration at 42 and a resonant frequency in second mode bending at 41, the two peaks being but three cycles apart. The true shape of the resonance curve 40 is impossible to obtain with motor-driven vibrators because they tend to drift into a resonant frequency as a result of coupling effects between the vibrator and the vibrating specimen. The structure used in producing Fig. 6 could not be excited by a motor-driven vibrator in small increments of frequency change around the region of the peaks 41 and 42, and could not be maintained steady at any frequency between seventy-three and seventy-six cycles per second, or at any frequency immediately on either side of these values. Between seventy-three and seventy-six cycles per second the energy feed-back from the vibrating member would cause the vibrator to drift into one resonant frequency or the other, and even when an attempt was made to operate on one of the peaks 41 or 42, the vibrator would tend to hunt between these two peaks. Resonance curves of the shape of the curve 40 can be obtained only by systems in which there can be no coupling effects, or energy feed-back, to the vibrating mechanism.

Conventional motor-driven vibrators furthermore do not lend themselves to varying the output force therefrom over an infinite number of steps while the vibrator is operating. The output of the present vibrators may be caused to undergo a smooth variation by the various electrical controls above described. In the case of magnetostrictive vibrators, the output force may also be varied by tuning the resonant system consisting of the inertia loading on the end of the magnetostrictive element and the spring factor of the element.

A further advantage of the present electronic vibrator is illustrated in determining the damping in the structure being vibrated by obtaining its logarithmic decrement. In this procedure, vibration pickups are placed at appropriate points on the structure and connected to amplifiers and a recording oscillograph in the customary manner. The structure under observation is then excited at any of its bending or torsional resonant frequencies. The recording oscillograph is started, and the power input to each of the vibrators is disconnected. Curve 50 in Fig. 7 represents the vibration amplitude curve of such a structure plotted against time. The point 51 represents the instant the power input to the vibrators is disconnected. When using the system of the present invention, the output force from the vibrators stops instantly and the vibration in the structure gradually diminishes according to the ideal logarithmic curve 52. It is seen that a time T is required for the vibration amplitude to be damped from a value R to a value S.

However, when excited by a conventional motor-driven vibrator, the structure continues to feed back energy into the vibrating or eccentric weights after the power has been disconnected at the instant 51, so that instead of obtaining the true logarithmic decrement curve 52, the amplitude may die away after the manner of the broken line curve 53. The error involved in obtaining a damping constant is apparent from the additional time T' required for the curve 53 to fall away to the specified value S. As a matter of fact, the varying frequency of the vibrator weights as the motor slows down commonly introduces new modes of vibration, and forced vibrations, causing the curve 53 to be very irregular. The curve 53 may lie below the curve 52, or it may be so erratic in general as to lose all significance as a true measure of damping for a specified mode of vibration. The principles illustrated in Fig. 7 with reference to torsional vibration are also true of vibration in bending, and may be illustrated by curves closely resembling the curves 50, 52, and 53. The present vibration-exciting system enables the damping in structural members of many types to be obtained by the simple method described, which was heretofore not practicable with the conventional types of vibration-excitation systems.

While it is preferred that the vibrators be attached rigidly to the member being vibrated so as to exert both tension and compression forces thereon, they may be applied in other ways so as to exert their forces only in compression, or only in tension, and they may be energized in other phase relations to produce the desired effects. For instance, in Fig. 1, the vibrator 38 may be moved to the station c' and phased 180 degrees with respect to the vibrator 39, provided that each vibrator exerts equal forces in tension and compression.

Various arrangements for applying the vibrators to the structures under investigation have been previously discussed in connection with the practicing of the method of the invention. Thus it is seen that for vibration in pure bending, first mode, one or more vibrators may be applied so as to act normal to the torsional axis, or else a plurality of vibrators may be applied in offset relation to the torsional axis in such a manner that no torsional moment is produced. For pure torsional vibration, first mode, the vibrators must be arranged and controlled so as to produce a true couple about the torsional axis, with no unbalanced forces having a lever arm about a bending axis. For higher orders of either bending or torsion, vibrators in proper phase relation may be applied at a plurality of sections along the member, between nodes, the arrangement at each section being the same as that just described for vibration in first mode bending and first mode torsion.

If the vibrators have been adjusted as a couple, to produce torsion, any subsequent unbalancing, as by increasing or decreasing the output of one of the vibrators, will result in a combination of vibration in both bending and torsion. To produce combination effects in torsion and bending it may also be desirable to locate the vibrators at different distances from and along the torsional axis, and also to appropriately vary the phase or frequency relations in addition to, or instead of, varying the vibrator outputs. Complex vibrations of this nature may be treated by the trial-and-error method, relying upon the general principles herein set out, as the factors affecting the various modes of vibration in a given member or structure are many.

In selecting the type of vibrator to be used and the most advantageous points of attachment therefor, consideration must be given to the location of nodal points in the structural member and to the relative mass and moment of inertia of the various sections about the bending and torsional axes with respect to the mass and operating characteristics of the vibrator. Unless the mass of all the apparatus attached to the member at any section is very small with respect to the mass of the member at that section, the vibration characteristics of the member will be changed so that the resonance curve, damping curve, etc., cannot be accurately plotted. In considering the characteristics of the vibrator it must be remembered that reciprocating and eccentric weight vibrators produce large amplitudes and exert a considerable amount of force, but the frequency range is limited and the frequency stability is bad. Magnetic vibrators produce smaller amplitudes and smaller forces, but the frequency stability is good and the frequency range is considerably extended, in comparison with mechanical vibrators. Magnetostrictive vibrators, on the other hand, develop high forces at exceedingly small amplitudes with absolute frequency stability and the frequency range, for practical purposes, is unlimited. They may be said to have a high spring factor, and are particularly adapted for exciting stiff structures which may vibrate only in small amplitudes, such as the massive wind tunnel fan blade, shown in Figs. 1 and 2. Thus, by applying magnetostrictive vibrators at or near the root of the fan blade, and at or near the base of the airplane wing, the characteristics of this type of vibrator are used to their best advantage and the effect of the mass of the vibrators on the moments of inertia of the relatively thick section B is negligible. With a relatively small energy input, in comparison to the mass of the blade 1, the vibrators 38 and 39 are able to excite the blade in torsional vibration at true resonant frequencies for the modes desired.

By driving the power amplifier in Fig. 1 with two or more beat frequency oscillators connected in parallel, the vibrators may be caused to excite a structural member simultaneously with two or more different frequencies under the absolute control of the operator. The magnitude of any beat frequency component may be varied by varying the output of the best frequency oscillator delivering that component. Thus the many ways of applying the present system make it possible to vibrate a structural member in various modes or combinations of modes in torsion and bending, and to simulate practically any condition of vibration which might be encountered in service. Additional modifications and changes may be made within the scope of the appended claims.

Further applications of the principles of my invention will now be described. One such application relates to the determination of the principal axes of flexure of a structural member, or the like, in bending. This may be conveniently accomplished by exciting the member to vibration in bending about a plurality of trial axes in succession, and comparing the resulting amplitudes about the different axes for known vibrating forces. By using my electronic vibrator system shown in Fig. 1, the power output of the vibrators may be maintained at a desired value by means of appropriate calibration of the output-controlling means, with or without power-measuring means in the output channels 36, 37. In order to avoid torsional vibration, the vibrating force should be applied through the torsional axis, or else a pair of vibrating forces should be applied on opposite sides of the torsional axis so as to produce a zero torsional moment, in the manner previously described. The method of locating the torsional axis is the same as described for the structural members illustrated. Unless the cross section approximates a circular, or annular, configuration, there will be found to be one or more predominate axes of flexure producing larger amplitudes of vibration than the other axes. This method of determining the principal axes of flexure is of especial utility in connection with irregular shapes and composite constructions of different materials. When the principal axes of flexure are known, it follows as a corollary that the axes of greatest stiffness are also known.

In the case of the fan blades, or airplane wing, herein illustrated, the principal axis of flexure lies approximately on the chord line, as shown in Fig. 1, and the greatest amplitude of vibration in bending, for a given power output of the vibrators, will be excited when the vibrators are directed normal to the axis. This corresponds with the procedure previously described for exciting the structure in vibration in pure bending. If the vibrators are directed at any angle other than a right angle, with respect to the principal axis of flexure of the airfoil, there will be a tendency to establish a new axis of flexure, normal to the direction of the vibrating force, but there will also be a component of the vibrating force normal to the assumed principal axis of flexure tending to produce a weaker vibration about the latter axis. The behavior of the airfoil under these conditions reveals the true direction of the predominate axis of flexure and the directions of other possible axes of flexure. The direction taken by the axis of flexure for any particular direction of excitation in bending may, of course, be readily determined by the orientation and location of the vibration pickups which indicate large amplitudes, since the pickups are inherently directional. If the fan blade or the like is warped, the directional characteristics of the pickups are particularly useful in determining the true direction of flexure at various sections along the blade.

The locating of nodes and regions of large amplitudes in torsional vibration has already been described with reference to the fan blade of Fig. 2 and the airplane wing of Fig. 4. It was seen that, because of the directional nature of the pickups, the stations $b$ and $b'$, carrying their pickups substantially normal to the torsional axis, registered very small amplitudes, while the stations $a$, $a'$, $c$, and $c'$, carrying their pickups remote from the torsional axis and aligned tangentially with the circular arcs of the vibratory motion, registered varying amplitudes in accordance with the angular excursions of these stations, depending upon the distribution of loops and nodes, as illustrated diagrammatically in Figs. 3 and 5. To obtain data for plotting the displacement curves in Figs. 3 and 5, vibration pickups may be mounted as described at a plurality of sections along the vibrating member, or, alternatively, if simultaneous phase relations are not sought, a single pickup may be moved along the member from section to section, as, for instance, along the line $c'$—$c'$—$c'$—$c'$. The latter method affords a quick way of locating loops and nodes without employing oscillograph equipment, since the output of a single pickup may be observed on an indicating instrument as the pickup is moved along the vibrating member.

This method may also readily be adapted for use on drive shafts and the like, either with or without a rotating airfoil, to locate loops and nodes in torsional vibration during operation of the shaft.

Another application of the principles of the present invention is concerned with the investigation of the damping and other properties of vibrating members while in operation. For example, the damping or other characteristics of an airfoil in operation in an air stream, or the damping of a drive shaft connected with a propeller, reduction gearing, or the like, may be vastly different from the values obtained from vibration tests performed when the members are not operating. To obtain the damping in operation, vibrators are applied and the member is excited artificially, in addition to the vibrations produced by normal operation. In the fan blade 1, or the airplane wing 11, vibrators may be applied as described in the foregoing specification to excite a particular mode of vibration in bending or torsion.

If, for instance, the investigation is concerned with torsional vibration, the pickups are arranged to respond to vibration in torsion, and an oscillograph record is made of the angular excursions of one or more stations on the member while the latter is operating, but before the artificial excitation is commenced. Then the vibrator, or vibrators, are energized and the record continued for a short interval, after which the artificial excitation is abruptly terminated. After allowing sufficient time for the resumption of the original state of vibration—that is, after the artificially excited vibrations have died away—the oscillograph may be stopped. Analysis of the record obtained in this manner will reveal that certain parts of the vibration record are caused by the artificially excited vibrations which are superimposed upon what might be called the natural vibrations of the member. The logarithmic decrement curve for these parts of the vibration record upon deenergization of the vibrators may then be drawn in the manner shown in Fig. 7. In this way the actual damping in an airfoil, or shaft, or the like, may be obtained under operating conditions and subject to all the attendant disturbing influences which have heretofore been eliminated from experimental procedure.

The torsional vibrator and pickup may be conveniently applied to any exposed portions of a shaft in the manner described, without interfering in any way with the operation thereof. In the case of the airplane wing, the arrangement illustrated in Fig. 4 may be employed by providing appropriate disposition for the connecting wires, not shown. In the case of the fan blade shown in Fig. 2, it is still possible to design the vibrators and pickups so that they will not appreciably interfere with the operation of the fan. The electrical connections may be carried within the blade or attached to outer surfaces in the form of flat conductor ribbons, slip rings being provided at the hub. It is also within the scope of the invention to apply the described method to propellers and other power-operated elements.

In the interest of avoiding interference with normal operation, it may be desirable to locate the vibrators, or both vibrators and pickups, within the structure. In a hollow metal propeller, for instance, the devices may be permanently welded at the desired stations, on the inside of the blade. Likewise, in a wing structure, the devices may be attached to the interior, rather than the exterior. In the case of a fan blade, propeller, or other device, mounted upon a shaft, the vibratory force may, for some purposes, be applied to the shaft so as to vibrate all the associated elements.

Having now described my invention and a preferred embodiment of apparatus for carrying out the methods of the invention, what I claim as new and desire to secure by Letters Patent is:

1. The method of determining the torsional vibration characteristics of a structural member, comprising selecting the approximate location of a torsional axis of said member, applying a vibrating couple about said axis, measuring the vibration amplitudes at various stations on various sections normal to said axis for various vibration frequencies, determining from the values of said amplitudes the actual location of said torsional axis and a nodal point thereon for a particular mode of torsional vibration, and then applying said vibrating couple substantially symmetrically about said axis at a section removed from said nodal point to produce pure torsional vibration free of bending.

2. The method of finding the locations and directions of the principal axes of flexure of a structural member, comprising the steps of locating the torsional axis of said member, applying a vibrating force of known output to said member in a direction normal to said torsional axis to tend to excite vibration in bending about an axis of flexure normal to said direction, successively changing said direction of application of said vibrating force, and measuring the deflection in bending for each direction of application of said vibrating force to determine the axes of flexure associated with relatively large amplitudes of deflection.

3. The method of determining nodal points in torsional vibration of a structural member which comprises applying phased vibrating forces in the relation of a mechanical couple about the torsional axis of said member for a particular mode of torsional vibration of said member to vibrate the same, and then measuring the amplitudes of vibration at various stations on various sections of said member normal to said axis to determine the transverse section or sections thereof in which the vibration amplitudes at all points in said section are very small.

4. The method of determining the torsional axis of a structural member for a particular mode of torsional vibration of said member, comprising selecting the approximate location of said torsional axis, applying vibrating forces to said member in the relationship of a mechanical couple comprising phased, equal forces acting oppositely upon said member at locations substantially symmetrically disposed about said approximate axis, measuring the vibration amplitudes at various stations on various sections normal to said axis for various vibration frequencies, and determining from the values of said amplitudes the actual location of said torsional axis.

5. The method of determining the torsional axis of a structural member for a particular mode of torsional vibration of said member, comprising selecting the approximate location of said torsional axis, applying vibrating forces to said member in the relationship of a mechanical couple comprising phased equal forces acting oppositely upon said member at locations substantially symmetrically about said approximate axis, measuring the vibration amplitudes at various stations on various sections normal to said approximate axis for various vibration frequencies, determining from the values of said amplitudes the apparent location of said torsional axis, and then applying said vibrating couple substantially symmetrically about the apparent location of the torsional axis, and repeating the aforesaid measurements to obtain a closer determination of the actual torsional axis for said particular mode of torsional vibration.

6. The method of determining the torsional axis of a structural member for a particular mode of torsional vibration of said member, comprising selecting the approximate location of said torsional axis, applying vibrating forces to said member in the relationship of a mechanical couple comprising phased, equal forces acting oppositely upon said member at locations substantially symmetrically disposed about said approximate axis, measuring the vibration amplitudes at various stations on a section normal to said axis for a particular resonant vibration frequency, and determining from the values of said amplitudes the point in said section at which the vibration amplitude is smallest and on either side of which point the vibration phase difference is one hundred eighty degrees.

7. The method of determining the location of the torsional axis of the structural member for a particular mode of torsional vibration of said member which comprises selecting the approximate location of said axis, applying vibrating forces to said member in the relationship of a mechanical couple comprising phased, equal forces acting oppositely upon said member at locations substantially symmetrically disposed about said approximate axis, measuring the vibration amplitudes at various stations along a transverse section of said member, adjusting the frequency of vibration until maximum amplitudes of vibration having a one hundred eighty degree phase difference are obtained at stations in said section on either side of said approximate location, and then determining from the amplitudes at various stations in said section, the intermediate point along the line of said section at which the vibration amplitude is smallest and on either side of which intermediate point the vibration phase difference is one hundred eighty degrees.

8. The method of determining the location of the torsional axis of the structural member for a particular mode of torsional vibration of said member which comprises selecting the approximate location of said axis, applying vibrating forces to said member in the relationship of a mechanical couple comprising phased, equal forces acting oppositely upon said member at locations substantially symmetrically disposed about said approximate axis, measuring the vibration amplitudes at various stations along a transverse section of said member, adjusting the frequency of vibration until maximum amplitudes of vibration having a one hundred eighty degree phase difference are obtained at stations in said section on either side of said approximate location, and then determining from the amplitudes at various stations in said section, the intermediate point along the line of said section at which the vibration amplitude is smallest and on either side of which intermediate point the vibration phase difference is one hundred eighty degrees, and then applying said equal forces substantially symmetrically about said intermediate point, and repeating the aforesaid measurements and adjustment to determine the intermediate point, defined as aforesaid, for the latter condition of application of said forces.

9. The method of determining the location of the torsional axis of a structural member for a particular mode of torsional vibration of said member which comprises selecting the approximate location of said axis, applying vibrating forces to said member in the relationship of a mechanical couple comprising phased, equal forces acting oppositely upon said member at locations substantially symmetrically disposed about said approximate axis, measuring the amplitudes at various stations on various sections normal to said axis for various vibration frequencies, adjusting the frequency of vibration until maximum amplitudes of vibration having a one hundred eighty degree phase difference are obtained at stations in each section on either side of the approximate axis, and then determining from the amplitudes and phasing at various stations in each section, the intermediate point in each section at which the vibration amplitude is smallest and on either side of which intermediate point the vibration phase difference is one hundred eighty degrees.

10. The method of determining the location of the torsional axis of a structural member for a particular mode of torsional vibration of said member which comprises selecting the approximate location of said axis, applying vibrating forces to said member in the relationship of a mechanical couple comprising phased, equal forces acting oppositely upon said member at locations substantially symmetrically disposed about said approximate axis, measuring the amplitudes at various stations on various sections normal to said axis for various vibration frequencies, adjusting the frequency of vibration until maximum amplitudes of vibration having a one hundred eighty degree phase difference are obtained at stations in each section on either side of said approximate axis, then determining from the amplitudes and phasing at various stations in each section, the intermediate point in each section at which the vibration amplitude is smallest and on either side of which intermediate point the vibration phase difference is one hundred eighty degrees, and then applying said equal forces symmetrically about a line joining said intermediate points and repeating the aforesaid measurements and adjustment to determine the intermediate points, defined as aforesaid, for the latter condition of application of said forces.

11. The method of determining the location of the torsional axis of a structural member for a particular mode of torsional vibration of said member which comprises selecting the approximate location of said axis, applying vibrating forces to said member in the relationship of a mechanical couple comprising phased, equal forces acting oppositely upon said member at locations substantially symmetrically disposed about said approximate axis, measuring the amplitudes at various stations on various sections normal to said axis for various vibration frequencies, adjusting the frequency of vibration until maximum amplitudes of vibration having a one hundred eighty degree phase difference are obtained at stations in each section on either side of the approximate axis, and then determining from the amplitudes and phasing at various stations in each section those sections at which the amplitudes at all stations are a minimum and the intermediate point in each of the other sections at which the vibration amplitude is smallest and on either side of which intermediate point the vibration phase difference is one hundred eighty degrees.

12. The method of producing vibration in pure bending free of torsion, in a structural member, which comprises determining the torsional axes and the resonant torsional vibration frequencies for various modes of torsional vibration, applying a vibrating force to said member in a direction normal to each of said axes successively to excite various modes of bending vibration, determining the approximate resonant frequencies of said modes of bending vibration, and then applying the vibrating force in a direction normal to the torsional axis for a mode of torsional vibration whose resonant frequency is closest to the approximate resonant frequency of one of said modes of bending vibration to excite vibration in pure bending in said one of said modes of bending vibration.

13. The method of producing torsional vibration in a structural member at a resonant frequency of said member, comprising selecting the approximate location of the torsional axis of said member for a particular mode of torsional vibration of said member, applying vibrating forces to said member in the relationship of a mechanical couple comprising phased, equal forces acting oppositely upon said member at locations substantially symmetrically disposed about said approximate axis, measuring the vibration amplitudes at various stations on various sections normal to said axis, determining from the values of said amplitudes the actual location of said torsional axis and a nodal point thereon for a particular mode of torsional vibration, and then applying said vibration couple substantially symmetrically about the torsional axis, so located, at a section of said member removed from said nodal point to produce pure torsional vibration free of bending.

14. The method of determining the nodal points in pure bending vibration of a structural member which comprises selecting the approximate location of the torsional axis of said member for a particular mode of torsional vibration of said member, applying vibrating forces to said member in the relationship of a mechanical couple comprising phased, equal forces acting oppositely upon said member at locations substantially symmetrically disposed about said approximate axis, measuring the vibration amplitudes at various stations on various sections of said member transverse to the torsional axis, determining from the values of said amplitudes the actual location of the torsional axis, applying a vibrating force to said member in the direction normal to said torsional axis, then measuring the amplitudes of vibration in various sections of said member transverse to the torsional axis to determine in which of said sections the vibration amplitudes are smallest.

15. The method of producing vibration in pure bending free of torsion, in a structural member, which comprises selecting the approximate locations of the torsional axes of said member for various modes of torsional vibration, applying vibrating forces to said member in the relationship of a mechanical couple comprising phased equal force acting oppositely upon said member at locations substantially symmetrically disposed about each of said approximate axes successively, vibrating said member in each of said modes of torsional vibration successively, measuring the vibration amplitudes at various stations on various sections normal to the axis for each respective mode of torsional vibration, determining from the values of said amplitudes the actual location of each of said torsional axes, determining the resonant frequencies for each of said modes of torsional vibration, applying a vibrating force to said member in a direction normal to each of said actual torsional axes successively to excite various modes of bending vibration, determining the approximate resonant frequencies of said bending modes of vibration, and then applying the vibrating force in a direction normal to the torsional axes for a mode of torsional vibration whose approximate resonant frequency is closest to the approximate resonant frequency of one of said modes of bending vibration to excite vibration in pure bending in said one of said modes of bending vibration.

16. The method of producing vibration in pure bending free of torsion, in a structural member, comprising selecting the approximate location of the torsional axis for a particular mode of torsional vibration of said member, applying vibrating forces to said member in the relationship of a mechanical couple comprising phased, equal forces acting oppositely upon said member at locations substantially symmetrically disposed about said approximate location, measuring the vibration amplitudes at various stations on various sections normal to said axis for various vibration frequencies, determining from the values of said amplitudes the actual location of said torsional axis, and then applying a vibrating force to said member in a direction normal to the torsional axis so determined.

JAMES CLARK.